(12) United States Patent
Ikeuchi et al.

(10) Patent No.: US 11,945,906 B2
(45) Date of Patent: Apr. 2, 2024

(54) EPOXY RESIN CURING AGENT, EPOXY RESIN COMPOSITION, AND USE OF AMINE COMPOSITION

(71) Applicant: MITSUBISHI GAS CHEMICAL COMPANY, INC., Tokyo (JP)

(72) Inventors: Kousuke Ikeuchi, Kanagawa (JP); Kazuki Kouno, Kanagawa (JP); Yuma Ohno, Kanagawa (JP); Emi Ota, Tokyo (JP); Aoi Yokoo, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 18/025,328

(22) PCT Filed: Aug. 19, 2021

(86) PCT No.: PCT/JP2021/030280
§ 371 (c)(1),
(2) Date: Mar. 8, 2023

(87) PCT Pub. No.: WO2022/059409
PCT Pub. Date: Mar. 24, 2022

(65) Prior Publication Data
US 2023/0323018 A1  Oct. 12, 2023

(30) Foreign Application Priority Data

Sep. 15, 2020 (JP) ................. 2020-154767

(51) Int. Cl.
*C08G 59/50* (2006.01)
*C08G 59/56* (2006.01)

(52) U.S. Cl.
CPC ......... *C08G 59/5026* (2013.01); *C08G 59/56* (2013.01)

(58) Field of Classification Search
CPC ............................ C08G 59/5026; C08G 59/56
USPC ....................................................... 528/422
See application file for complete search history.

(56) References Cited

U.S. PATENT DOCUMENTS

| 4,070,399 | A | 1/1978 | Butte, Jr. |
| 5,371,293 | A | 12/1994 | Takagawa |
| 5,741,928 | A | 4/1998 | Kobayashi et al. |

| 2011/0190419 | A1 | 8/2011 | Wittenbecher et al. |
| 2016/0229792 | A1 | 8/2016 | Yamamoto et al. |
| 2018/0044279 | A1 | 2/2018 | Shimizu et al. |
| 2019/0382524 | A1 | 12/2019 | Gerber |
| 2020/0140633 | A1 | 5/2020 | Oota et al. |
| 2020/0354604 | A1 | 11/2020 | Grötzinger et al. |

FOREIGN PATENT DOCUMENTS

| CN | 102105441 A | 6/2011 |
| CN | 108603009 A | 9/2018 |
| CN | 111417667 A | 7/2020 |
| CN | 111566142 A | 8/2020 |
| JP | 6-279368 A | 10/1994 |
| JP | 8-143514 A | 6/1996 |
| JP | 2001-163955 A | 6/2001 |
| WO | 2015/041261 A1 | 3/2015 |
| WO | 2015/144391 | 10/2015 |
| WO | 2016/143539 A1 | 9/2016 |
| WO | 2018/108706 A1 | 6/2018 |

OTHER PUBLICATIONS

Tanaka et al., "Effects of Salicylic Acid as an Accelerator and of Molecular Structure of the Curing Agents on the Properties of Epoxy Resins Cured with Various Amines", Kobunshi Ronbunshu, 1990, pp. 159-164.
International Search Report issued in International Bureau of WIPO Patent Application No. PCT/JP2021/030280, dated Sep. 28, 2021, along with an English translation thereof.
Written Opinion issued in International Bureau of WIPO Patent Application No. PCT/JP2021/030280, dated Sep. 28, 2021, along with an English translation thereof.
Gu Xiaohong et al., "Advanced Techniques for Nanocharacterization of Polymeric Coating Surfaces", Journal of Coatings Technology and Research, vol. 1, No. 3, Jul. 2004, pp. 191-200.

*Primary Examiner* — David T Karst
(74) *Attorney, Agent, or Firm* — GREENBLUM & BERNSTEIN, P.L.C.

(57) ABSTRACT

Provided are an epoxy resin curing agent containing an amine composition or a modified product thereof, wherein the amine composition contains bis(aminomethyl)cyclohexane (A), a compound (B) represented by the specific formula (1), and a compound (C) represented by the specific formula (2), and wherein a mass ratio of the component (B) to the component (C) [(B)/(C)] is from 0.01 to 5.0, an epoxy resin composition, and use of an amine composition for an epoxy resin curing agent.

8 Claims, No Drawings

EPOXY RESIN CURING AGENT, EPOXY RESIN COMPOSITION, AND USE OF AMINE COMPOSITION

TECHNICAL FIELD

The present invention relates an epoxy resin curing agent, an epoxy resin composition, and use of an amine composition.

BACKGROUND ART

Bis(aminomethyl)cyclohexane is known as a useful compound as a starting material for a polyamide resin and a curing agent for an epoxy resin. PTL 1 discloses a method for producing bis aminomethyl cyclohexane, wherein an aromatic dinitrile is hydrogenated using a catalyst carrying 1 to 10 wt % of ruthenium on a carrier in the presence of 0.5 times by weight or more of ammonia relative to the aromatic dinitrile.

Bis(aminomethyl)cyclohexane as an epoxy resin curing agent is useful because bis(aminomethyl)cyclohexane has low viscosity and has fast curing property among epoxy resin curing agents and enables epoxy resin cured products having a high glass transition temperature (Tg) to be provided. In some examples, bis(aminomethyl)cyclohexane and a curing accelerator are used in combination in an epoxy resin curing agent in order to further improve curing speed, physical properties of a cured product, and the like.

For example, PTL 2 discloses an epoxy resin curing agent consisting of a polyamine compound containing bis(aminomethyl)cyclohexane and/or a modified product thereof, a predetermined aliphatic amine compound, and a curing accelerator. PTL 3 discloses a method for producing a fiber reinforced composite article, the method using a resin composition comprising (b1) a liquid epoxy resin, (b2) a curing agent containing 1,3-bis(aminomethyl)cyclohexane, and (b3) an accelerator containing at least one compound selected from the group consisting of sulfonic acid and imidazolium salt of a sulfonic acid.

However, it is generally known that Tg of an epoxy resin cured product to be provided tends to decrease when impurities are included in an amine curing agent for use in the epoxy resin composition or other components such as a curing accelerator are added thereto. For example, NPL 1 demonstrates, when various amine curing agents are used as the curing agent for an epoxy resin, addition of salicylic acid (SA) as a curing accelerator results in a decrease in Tg of epoxy resin cured products to be provided (see Table 3).

CITATION LIST

Patent Literature

PTL 1: JP 06-279368 A
PTL 2: JP 2001-163955 A
PTL 3: WO 2015/144391

Non Patent Literature

NPL 1: Yuko Tanaka, Minoru Serizawa, and Hiromasa Ogawa "Effects of Salicylic Acid as an Accelerator and of Molecular Structure of the Curing Agents on the Properties of Epoxy Resins Cured with Various Amines", Kobunshi Ronbunshu, Vol. 47, No. 2, p 159-164, 1990

SUMMARY OF INVENTION

Technical Problem

Furthermore, when bis(aminomethyl)cyclohexane is used as an epoxy resin curing agent, curing may be excessively fast depending on applications of the epoxy resin composition, thus making bis(aminomethyl)cyclohexane unsuitable for use.

One example of methods for producing a fiber-reinforced composite material (hereinafter, also referred to as "FRP (fiber reinforced plastics)") is a filament winding process. In the filament winding process, reinforcing fiber yarn impregnated with a matrix resin or a precursor thereof is used to cover the outer surface of a mandrel or the like to thereby mold a formed article. Although a thermosetting resin composition such as an epoxy resin composition can be used as a matrix resin precursor, there occurs a problem of curing of the thermosetting resin before molding if the resin composition has a short pot life and has fast curing property.

Use of a curing agent other than bis(aminomethyl)cyclohexane can retard curing of the epoxy resin composition, but in this case, Tg of an epoxy resin cured product may decrease. A matrix resin for FRP having an excessively low Tg is not preferred because the heat resistance of a formed article decreases.

An object of the present invention is to provide an epoxy resin curing agent comprising an amine composition containing bis(aminomethyl)cyclohexane or a modified product thereof, the epoxy resin curing agent capable of maintaining a high Tg of an epoxy resin cured product to be provided while suppressing excessive fast curing property resulted from bis(aminomethyl)cyclohexane, an epoxy resin composition comprising the epoxy resin curing agent, and use of an amine composition for an epoxy resin curing agent.

Solution to Problem

The present inventors have found that the above problems can be solved by an epoxy resin curing agent comprising bis(aminomethyl)cyclohexane and an amine composition containing two kinds of amine compounds each having a predetermined structure at a predetermined ratio or a modified product thereof.

Accordingly, the present invention relates to the following.

[1] An epoxy resin curing agent comprising an amine composition or a modified product thereof, wherein the amine composition comprises bis(aminomethyl)cyclohexane (A), a compound (B) represented by the following formula (1), and a compound (C) represented by the following formula (2), and wherein a mass ratio of the component (B) to the component (C) [(B)/(C)] is from 0.01 to 5.0:

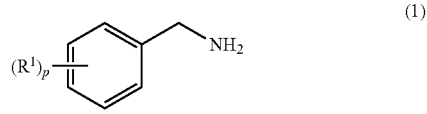

(1)

wherein R¹ represents an alkyl group having 1 to 6 carbon atoms or a group represented by the following formula (1A), and p is a number of 1 to 3,

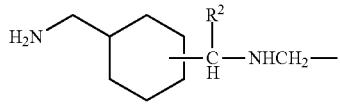
(1A)

wherein R² represents a hydrogen atom or NH₂—,

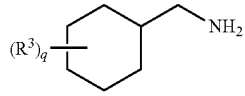
(2)

wherein R³ is an alkyl group having 1 to 6 carbon atoms optionally having a hydroxy group, R⁴NHCH₂—, where R⁴ represents an alkyl group having 1 to 6 carbon atoms, or a group represented by the following formula (2A), and q is a number of 0 to 2,

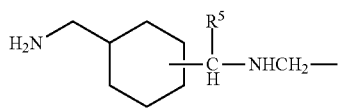
(2A)

wherein R⁵ represents a hydrogen atom or NH₂—.

[2] The epoxy resin curing agent according to above [1], wherein the content of the component (B) based on 100 parts by mass of the component (A) is 0.01 parts by mass or more.

[3] The epoxy resin curing agent according to the above [1] or [2], wherein the total content of the component (B) and the component (C) based on 100 parts by mass of the component (A) is from 2.5 to 50.0 parts by mass.

[4] The epoxy resin curing agent according to any one of the above [1] to [3], wherein the component (A) is 1,3-bis(aminomethyl)cyclohexane.

[5] The epoxy resin curing agent according to any one of the above [1] to [4], wherein the component (B) is at least one selected from the group consisting of a compound (1-1) and a compound (1-2) represented by the following formulas.

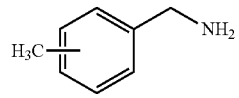
(1-1)

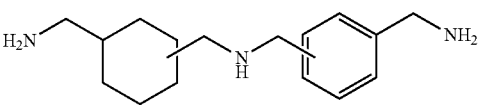
(1-2)

[6] The epoxy resin curing agent according to any one of the above [1] to [5], wherein the component (C) is at least one selected from the group consisting of compounds (2-1) to (2-6) represented by the following formulas.

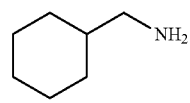
(2-1)

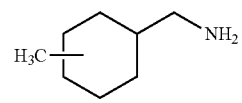
(2-2)

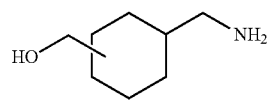
(2-3)

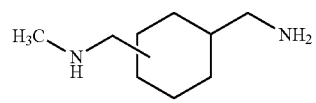
(2-4)

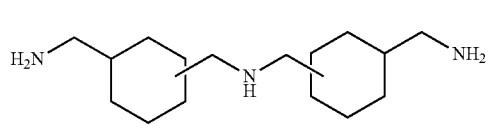
(2-5)

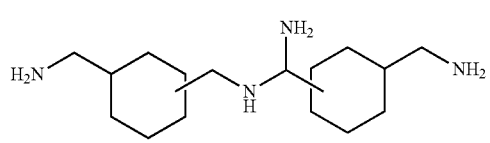
(2-6)

[7] An epoxy resin composition comprising an epoxy resin and the epoxy resin curing agent according to any one of the above [1] to [6].

[8] Use of an amine composition for an epoxy resin curing agent, wherein the amine composition comprises bis(aminomethyl)cyclohexane (A), a compound (B) represented by the following formula (1), and a compound (C) represented by the following formula (2), and wherein a mass ratio of the component (B) to the component (C) [(B)/(C)] is from 0.01 to 5.0:

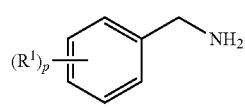
(1)

wherein R¹ represents an alkyl group having 1 to 6 carbon atoms or a group represented by the following formula (1A), and p is a number of 1 to 3,

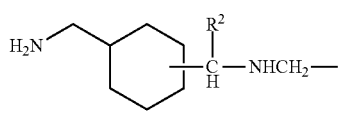
(1A)

wherein $R^2$ represents a hydrogen atom or $NH_2$—,

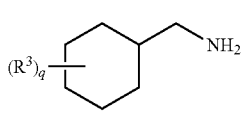

(2)

wherein $R^3$ is an alkyl group having 1 to 6 carbon atoms optionally having a hydroxy group, $R^4NHCH_2$—, where $R^4$ represents an alkyl group having 1 to 6 carbon atoms, or a group represented by the following formula (2A), and q is a number of 0 to 2,

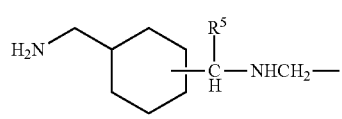

(2A)

wherein $R^5$ represents a hydrogen atom or $NH_2$—.

Advantageous Effects of Invention

The epoxy resin curing agent of the present invention can provide an epoxy resin composition that can maintain a high Tg of an epoxy resin cured product to be provided while suppressing excessive fast curing resulted from bis(aminomethyl)cyclohexane.

DESCRIPTION OF EMBODIMENTS

[Epoxy Resin Curing Agent]

The epoxy resin curing agent of the present invention comprises amine composition containing bis(aminomethyl)cyclohexane (A) (hereinafter also simply referred to as "the component (A)"), a compound (B) represented by the following formula (1) (hereinafter also simply referred to as "component (B)"), and a compound (C) represented by the following formula (2) (hereinafter simply referred to as "the component (C)"), the mass ratio of the component (B) to the component (C) [(B)/(C)] being from 0.01 to 5.0, or a modified product thereof:

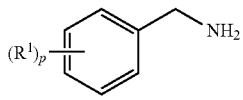

(1)

wherein $R^1$ represents an alkyl group having 1 to 6 carbon atoms or a group represented by the following formula (1A), and p is a number of 1 to 3,

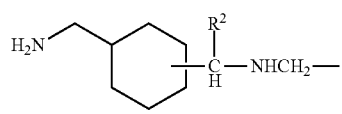

(1A)

wherein $R^2$ represents a hydrogen atom or $NH_2$—,

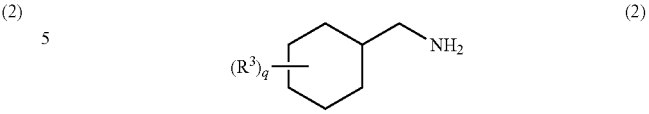

(2)

wherein $R^3$ is an alkyl group having 1 to 6 carbon atoms optionally having a hydroxy group, $R^4NHCH_2$—, where $R^4$ represents an alkyl group having 1 to 6 carbon atoms, or a group represented by the following formula (2A), and q is a number of 0 to 2,

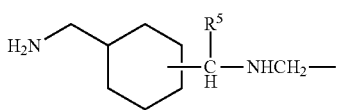

(2A)

wherein $R^5$ represents a hydrogen atom or $NH_2$—.

The epoxy resin curing agent of the present invention can maintain a high Tg of an epoxy resin cured product to be provided while suppressing excessive fast curing resulted from bis(aminomethyl)cyclohexane. The reason is not clear but can be considered as follows.

Bis(aminomethyl)cyclohexane as the component (A) has low viscosity and has fast curing property among epoxy resin curing agents and enables epoxy resin cured products having a high Tg to be provided. In contrast, the component (B), which is a benzyl amine derivative having a predetermined structure, cures at a relatively low speed. Thus, use of the component (B) is considered to enable the curing speed to be lower.

When the component (B) is used as the epoxy resin curing agent, Tg of an epoxy resin cured product to be provided tends to be lower. However, it is considered that use of the component (B) and the component (C), which is a cyclohexylamine derivative, at a predetermined ratio can maintain Tg of an epoxy resin cured product to be provided in a high range.

<Bis(Aminomethyl)Cyclohexane (A)>

The amine composition used in the epoxy resin curing agent of the present invention contains bis(aminomethyl)cyclohexane as the component (A). When the amine composition contains the component (A) as the main component, an epoxy resin cured product having a high Tg can be provided.

The "main component" referred to herein means an amine component having the highest content in the amine composition and more specifically means an amine component having a content in the amine composition of preferably 50 mass % or more, more preferably 60 mass % or more, and further preferably 70 mass % or more.

Examples of bis(aminomethyl)cyclohexane include 1,2-bis(aminomethyl)cyclohexane, 1,3-bis(aminomethyl)cyclohexane, and 1,4-bis(aminomethyl)cyclohexane, and these can be used singly or in combinations of two or more thereof. From the viewpoint of low viscosity, curability, and handling property, 1,3-bis(aminomethyl)cyclohexane is preferred.

Both a cis isomer and a trans isomer are included in bis(aminomethyl)cyclohexane. The content ratio of the cis isomer to the trans isomer is optional, but when both the cis isomer and the trans isomer are included, bis(aminomethyl)

cyclohexane can be handled as a liquid due to freezing point depression even under a low temperature environment during winter or the like. Thus, the content ratio of the cis isomer/trans isomer is preferably from 99/1 to 1/99, more preferably from 95/5 to 30/70, further preferably from 90/10 to 50/50, and still further preferably from 85/15 to 60/40.

<Compound (B)>

The component (B) for use in the present invention is a compound represented by the following formula (1). Use of the component (B) can suppress excessive fast curing resulted from the component (A) when the epoxy resin curing agent of the present invention is used.

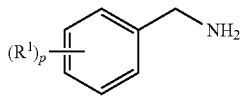
(1)

wherein $R^1$ represents an alkyl group having 1 to 6 carbon atoms or a group represented by the following formula (1A), and p is a number of 1 to 3,

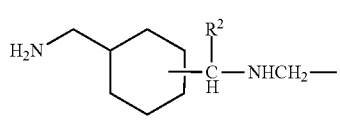
(1A)

wherein $R^2$ represents a hydrogen atom or $NH_2$—.

In the formula (1), examples of the alkyl group having 1 to 6 carbon atoms in $R^1$ can include linear or branched chain alkyl groups having 1 to 6 carbon atoms. Specific examples thereof include a methyl group, an ethyl group, various propyl groups, various butyl groups, various pentyl groups, and various hexyl groups. "Various" referred to herein indicates incorporation of linear chain and any branched chain groups. Of these, alkyl groups having 1 to 4 carbon atoms are preferred, alkyl groups having 1 to 3 carbon atoms are more preferred, a methyl group and an ethyl group are further preferred, and a methyl group is still further preferred.

In the group represented by the formula (1A), $R^2$ is a hydrogen atom or $NH_2$— and preferably a hydrogen atom.

In the formula (1), p is a number of 1 to 3, preferably 1 to 2, and more preferably 1.

From the viewpoint of suppressing excessive fast curing resulted from the component (A), when the epoxy resin curing agent of the present invention is used, the component (B) is preferably at least one selected from the group consisting of a compound (1-1) and a compound (1-2) represented by the following formulas and more preferably includes a compound (1-1) represented by the following formula.

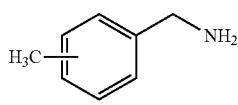
(1-1)

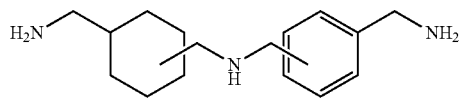
(1-2)

Examples of the compound (1-1) include 2-methylbenzylamine, 3-methylbenzylamine, and 4-methylbenzylamine, and these can be used singly or in combinations of two or more thereto. From the viewpoint of suppressing excessive fast curing when the epoxy resin curing agent of the present invention is used, 3-methylbenzylamine is preferred.

When the component (B) includes the compound (1-1), the content of the compound (1-1) in the component (B) is preferably 20 mass % or more, more preferably 30 mass % or more, and further preferably 50 mass % or more from the viewpoint of suppressing excessive fast curing resulted from the component (A), and the upper limit is 100 mass %.

<Compound (C)>

The component (C) for use in the present invention is a compound represented by the following formula (2). Use of the component (C) can maintain Tg of a cured product to be provided in a high range while suppressing excessive fast curing resulted from the component (A).

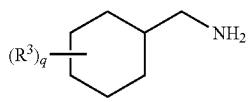
(2)

wherein $R^3$ is an alkyl group having 1 to 6 carbon atoms optionally having a hydroxy group, $R^4NHCH_2$—, where $R^4$ represents an alkyl group having 1 to 6 carbon atoms, or a group represented by the following formula (2A), and q is a number of 0 to 2,

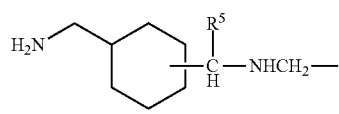
(2A)

wherein $R^5$ represents a hydrogen atom or $NH_2$—.

In the formula (2), examples of the alkyl group having 1 to 6 carbon atoms optionally having a hydroxy group in $R^3$ can include linear or branched chain alkyl groups having 1 to 6 carbon atoms or groups provided by substituting one or more hydrogen atoms in the alkyl groups with a hydroxy group. When $R^3$ is an alkyl group having a hydroxy group, the number of the hydroxy group is preferably from 1 to 3, more preferably from 1 to 2, and further preferably 1.

Specific examples thereof include a methyl group, an ethyl group, various propyl groups, various butyl groups, various pentyl groups, various hexyl groups, a hydroxymethyl group, a hydroxyethyl group, a hydroxypropyl group, a hydroxybutyl group, a hydroxypentyl group, and a hydroxyhexyl group. Of these, alkyl groups having 1 to 4 carbon atoms optionally having a hydroxy group are preferred, alkyl groups having 1 to 3 carbon atoms optionally having a hydroxy group are more preferred, and a methyl group, an ethyl group, or a hydroxymethyl group is further preferred.

R⁴ in R⁴NHCH₂— is an alkyl group having 1 to 6 carbon atoms, and examples thereof can include linear or branched chain alkyl groups having 1 to 6 carbon atoms. Specific examples thereof include a methyl group, an ethyl group, various propyl groups, various butyl groups, various pentyl groups, and various hexyl groups. Of these, alkyl groups having 1 to 4 carbon atoms are preferred, alkyl groups having 1 to 3 carbon atoms are more preferred, a methyl group and an ethyl group are further preferred, and a methyl group is still further preferred.

In the group represented by the formula (2A), $R^5$ is a hydrogen atom or NH₂— and preferably a hydrogen atom.

In the formula (2), q is a number of 0 to 2 and preferably 0 to 1.

When the epoxy resin curing agent of the present invention is used, from the viewpoint of maintaining Tg of a cured product to be provided in a high range while suppressing excessive fast curing resulted from the component (A), the component (C) is preferably at least one selected from the group consisting of compounds (2-1) to (2-6) represented by the following formulas, more preferably includes at least one selected from the group consisting of the compounds (2-1) to (2-4) represented by the following formulas, and further preferably includes at least one selected from the group consisting of the compounds (2-1) and (2-2).

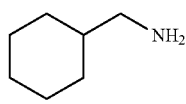

(2-1)

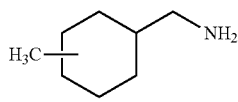

(2-2)

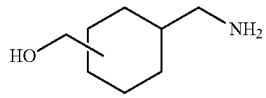

(2-3)

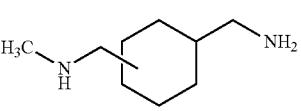

(2-4)

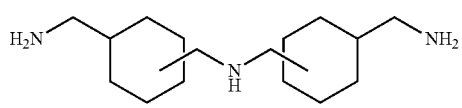

(2-5)

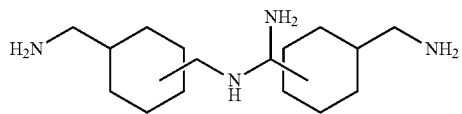

(2-6)

The compound (2-1) is cyclohexylmethylamine. Examples of the compound (2-2) include 2-methyl-1-aminomethylcyclohexane, 3-methyl-1-aminomethylcyclohexane, and 4-methyl-1-aminomethylcyclohexane, and these can be used singly or in combinations of two or more thereto. When the epoxy resin curing agent of the present invention is used, from the viewpoint of maintaining Tg of a cured product to be provided in a high range while suppressing excessive fast curing, 3-methyl-1-aminomethylcyclohexane is preferred.

When the component (C) includes at least one selected from the group consisting of the compounds (2-1) and (2-2), the total content of the compound (2-1) and compound (2-2) in the component (C) is preferably 10 mass % or more, more preferably 15 mass % or more, further preferably 20 mass % or more from the viewpoint of maintaining Tg of a cured product to be provided in a high range while suppressing excessive fast curing resulted from the component (A), and the upper limit is 100 mass % or less.

The mass ratio of the component (B) to the component (C) [(B)/(C)] contained in the amine composition for use in the epoxy resin curing agent of the present invention is from 0.01 to 5.0, preferably from 0.03 to 5.0, and more preferably from 0.1 to 5.0. When the mass ratio [(B)/(C)] is 0.01 or more, excessive fast curing can be suppressed. When the mass ratio [(B)/(C)] is 5.0 or less, Tg of the cured product to be provided can be maintained in a high range while excessive fast curing is suppressed.

The content of the component (B) in the amine composition for use in the epoxy resin curing agent of the present invention is not particularly limited as long as the mass ratio [(B)/(C)] falls within the range of 0.01 to 5.0. From the viewpoint of suppressing excessive fast curing resulted from the component (A), the content is preferably 0.01 parts by mass or more, more preferably 0.1 parts by mass or more, further preferably 0.5 parts by mass or more, still further preferably 1.0 part by mass or more, still further preferably 2.0 parts by mass or more, and still further preferably 2.5 parts by mass or more based on 100 parts by mass of the component. From the viewpoint of maintaining Tg of a cured product to be provided in a high range, the content is preferably 25.0 parts by mass or less, more preferably 20.0 parts by mass or less, further preferably 15.0 parts by mass or less, and still further preferably 12.5 parts by mass or less.

The content of the component (C) in the amine composition for use in the epoxy resin curing agent of the present invention is not particularly limited as long as the mass ratio [(B)/(C)] falls within the range of 0.01 to 5.0. From the viewpoint of maintaining Tg of a cured product to be provided in a high range while suppressing excessive fast curing resulted from the component (A), the content is preferably 0.1 parts by mass or more, more preferably 0.5 parts by mass or more, further preferably 1.0 part by mass or more, still further preferably 2.0 parts by mass or more, still further preferably 2.5 parts by mass or more, and preferably 35.0 parts by mass or less, more preferably 30.0 parts by mass or less, further preferably 25.0 parts by mass or less based on 100 parts by mass of the component (A).

In the amine composition for use in the epoxy resin curing agent of the present invention, the total content of the component (B) and the component (C) based on 100 parts by mass of the component (A) is preferably from 2.5 to 50.0 parts by mass, more preferably from 5.0 to 40.0 parts by mass, and further preferably from 10.0 to 30.0 parts by mass from the viewpoint of maintaining Tg of a cured product to be provided in a high range while suppressing excessive fast curing resulted from the component (A).

The total content of the components (A) to (C) in the amine composition for use in the epoxy resin curing agent of the present invention is preferably 80 mass % or more, more preferably 90 mass % or more, further preferably 95 mass % or more, and still further preferably 98 mass % or more from the viewpoint of making the component (A) the main component and from the viewpoint of achieving the effects of the present invention. The upper limit thereof is 100 mass %.

A method for producing an amine composition for use in the epoxy resin curing agent of the present invention is not particularly limited, and the amine composition can be produced by formulating and mixing the components (A) to (C) each in a predetermined amount. If it is possible to adjust a catalyst to be used and production conditions in production of the component (A) and conduct a reaction for generating the component (B) and the component (C) at a predetermined ratio in parallel with the production of the component (A), a method using this is also exemplified. In this case, the contents of the components (A) to (C) in the amine composition can be determined by gas chromatography analysis or the like.

The epoxy resin curing agent of the present invention may include a modified product of the amine composition. Specific examples of the modified product include reaction products provided by reacting the amine composition with an epoxy group-containing compound, an unsaturated hydrocarbon compound, a carboxylic acid or a derivative thereof, or the like; and Mannich reaction products provided by reacting the amine composition with a phenol compound and an aldehyde compound. Of these, from the viewpoint of forming an epoxy resin cured product excellent in chemical resistance and from a viewpoint of cost efficiency, reaction products of an amine composition and an epoxy group-containing compound are preferred.

The epoxy group-containing compound may have at least one epoxy group and a compound having two or more epoxy groups is more preferred.

Specific examples of the epoxy group-containing compound include epichlorohydrin, butyl diglycidyl ether, neopentyl glycol diglycidyl ether, 1,3-propanediol diglycidyl ether, 1,4-butanediol diglycidyl ether, 1,6-hexanediol diglycidyl ether, biphenol diglycidyl ether, dihydroxynaphthalene diglycidyl ether, dihydroxyanthracene diglycidyl ether, triglycidyl isocyanurate, tetraglycidyl glycoluril, polyfunctional epoxy resins having a glycidylamino group derived from m-xylylenediamine, polyfunctional epoxy resins having a glycidylamino group derived from 1,3-bis(aminomethyl)cyclohexane, polyfunctional epoxy resins having a glycidylamino group derived from diaminodiphenylmethane, polyfunctional epoxy resins having a glycidylamino group derived from p-aminophenol, polyfunctional epoxy resins having a glycidyloxy group derived from p-aminophenol, polyfunctional epoxy resins having a glycidyloxy group derived from bisphenol A, polyfunctional epoxy resins having a glycidyloxy group derived from bisphenol F, polyfunctional epoxy resins having a glycidyloxy group derived from phenol novolac, and polyfunctional epoxy resins having two or more glycidyloxy groups derived from resorcinol. These can be used singly or in combinations of two or more thereof.

The epoxy group-containing compound is more preferably a compound including an aromatic ring or an alicyclic structure in the molecule, further preferably a compound including an aromatic ring in the molecule, and still further preferably a polyfunctional epoxy resin having a glycidyloxy group derived from bisphenol A from the viewpoint of forming an epoxy resin cured product excellent in chemical resistance and from the viewpoint of curing.

A reaction product is provided by ring-opening addition reacting an amine composition and an epoxy group-containing compound in a known manner. In an exemplary method, a reactor is charged with the amine composition, the epoxy group-containing compound is added batchwise or added in portions by dropwise addition or the like thereto and subjected to a reaction by heating. The addition reaction is preferably conducted under an inert atmosphere such as nitrogen gas.

The amount of the amine composition and epoxy group-containing compound to be used is not particularly limited as long as a ratio is achieved at which a modified product to be provided contains an amino group having active hydrogen. In the addition reaction, an excess of the amine composition is preferably used relative to the epoxy equivalent of the epoxy group-containing compound from the viewpoint that a modified product to be provided exhibits a function as an epoxy resin curing agent. Specifically, the amine composition and epoxy group-containing compound are used so as to achieve preferably [D]/[G]=50/1 to 4/1 and more preferably [D]/[G]=20/1 to 8/1, wherein [D] represents the number of active hydrogen atoms in the amine composition, and [G] represents the number of epoxy groups of the epoxy group-containing compound.

The temperature and reaction time during the addition reaction can be appropriately selected. From the viewpoint of the reaction rate, productivity, prevention of decomposition of the starting material, and the like, the temperature during the addition reaction is preferably from 50 to 150° C. and more preferably from 70 to 120° C. The reaction time is preferably from 0.5 to 12 hours and more preferably from 1 to 6 hours after addition of the epoxy group-containing compound is completed.

The epoxy resin curing agent of the present invention may be a curing agent consisting of the amine composition or a modified product thereof and may contain a curing agent component other than the components (A) to (C) or a modified product thereof in addition to the amine composition or a modified product thereof. Examples of other curing agent components include polyamine compounds or modified products thereof other than the components (A) to (C) or a modified product thereof.

To the curing agent of the present invention, a known non-reactive diluent and the like may be blended as long as the effects of the present invention are not impaired.

The content of the amine composition or a modified product thereof in the curing agent of the present invention is, however, preferably 50 mass % or more, more preferably 70 mass % or more, further preferably 80 mass % or more, still further preferably 90 mass % or more relative to the entire curing agent components in the curing agent from the viewpoint of achieving the effects of the present invention. The upper limit thereof is 100 mass %.

The method of preparing the epoxy resin curing agent of the present invention is not particularly limited and may be appropriately selected depending on the form of use, the apparatus to be used, and the type and ratio of the components to be blended. For example, the epoxy resin curing agent can be prepared by formulating and mixing the amine composition or a modified product, and other curing agent components and a non-reactive diluent, which are used as required. Furthermore, on preparation of the epoxy resin composition, preparation may be conducted by simultaneously mixing the components included in the epoxy resin curing agent and the epoxy resin.

[Epoxy Resin Composition]

The epoxy resin composition of the present invention comprises an epoxy resin and the epoxy resin curing agent. The epoxy resin curing agent of the present invention can provide a cured product having a high Tg while excessive fast curing is suppressed.

The epoxy resin as the main agent of the epoxy resin composition may be any of saturated or unsaturated aliphatic compounds or alicyclic compounds, aromatic compounds, and heterocyclic compounds. From the viewpoint of providing a cured product having a high Tg, an epoxy resin including an aromatic ring or an alicyclic structure in the molecule is preferred.

Specific examples of the epoxy resin include at least one resin selected from the group consisting of epoxy resins having a glycidylamino group derived from m-xylylenediamine, epoxy resins having a glycidylamino group derived from p-xylylenediamine, epoxy resins having a glycidylamino group derived from 1,3-bis(aminomethyl)cyclohexane, epoxy resins having a glycidylamino group derived from 1,4-bis(aminomethyl)cyclohexane, epoxy resins having a glycidylamino group derived from diaminodiphenylmethane, epoxy resins having a glycidylamino group and/or a glycidyloxy group derived from p-aminophenol, epoxy resins having a glycidyloxy group derived from bisphenol A, epoxy resins having a glycidyloxy group derived from bisphenol F, epoxy resins having a glycidyloxy group derived from phenol novolac, and epoxy resin having a glycidyloxy group derived from resorcinol. The epoxy resins described above may be used in mixture of two or more thereof.

Of those described above, from the viewpoint of providing a cured product having a high Tg, as the epoxy resin, ones including, as the main component, at least one selected from the group consisting of epoxy resins having a glycidylamino group derived from m-xylylenediamine, epoxy resins having a glycidylamino group derived from p-xylylenediamine, epoxy resins having a glycidyloxy group derived from bisphenol A, and epoxy resins having a glycidyloxy group derived from bisphenol F are preferred. From the viewpoint of providing a cured product having a high Tg and from the viewpoint of availability and cost efficiency, ones including, as the main component, an epoxy resin having a glycidyloxy group derived from bisphenol A are more preferred.

The "main component" referred to herein means that other components may be included without departing from the gist of the present invention, meaning preferably from 50 to 100 mass %, more preferably from 70 to 100 mass %, and further preferably from 90 to 100 mass % of the total.

The content of the epoxy resin curing agent in the epoxy resin composition of the present invention is an amount at which the ratio of the number of active hydrogen atoms in the epoxy resin curing agent to the number of epoxy groups in the epoxy resin (number of active hydrogen atoms in epoxy resin curing agent/number of epoxy groups in epoxy resin) is preferably from 1/0.5 to 1/2, more preferably from 1/0.75 to 1/1.5, and further preferably from 1/0.8 to 1/1.2.

The epoxy resin composition of the present invention may also comprise a modifying component such as a filler and a plasticizer, a component for adjusting flowability such as a thixotropic agent, and other components such as a pigment, a leveling agent, a tackifier and elastomer fine particles depending on the use.

However, the total content of the epoxy resin and the epoxy resin curing agent in the epoxy resin composition is preferably 50 mass % or more, more preferably 70 mass % or more, further preferably 80 mass % or more, and still further preferably 90 mass % or more from the viewpoint of achieving the effects of the present invention. The upper limit thereof is 100 mass %.

The method for preparing the epoxy resin composition of the present invention is not particularly limited, and the composition may be produced by mixing the epoxy resin, the epoxy resin curing agent, and other components as required by a known method using a known apparatus. The order of mixing the components to be contained in the epoxy resin composition is not particularly limited. The epoxy resin curing agent may be prepared and then mixed with an epoxy resin, or the components (A) to (C) constituting the epoxy resin curing agent and other components may be mixed with an epoxy resin simultaneously to prepare the epoxy resin composition.

Curing the epoxy resin composition of the present invention by a known method can provide an epoxy resin cured product. Conditions for curing the epoxy resin composition are appropriately selected depending on applications and forms.

The epoxy resin composition of the present invention provides an effect of retarding the curing speed, in comparison with an epoxy resin composition in which the component (A) is used as the epoxy resin curing agent.

For example, for the epoxy resin composition of the present invention, the time for the reaction ratio to reach 100% in the case of heating at 120° C. (curing time at 120° C.) in measurement using a differential scanning calorimeter is preferably 10.0 minutes or more. The upper limit of the curing time is usually 20.0 minutes or less and preferably 15.0 minutes or less from the viewpoint of productivity. The above curing time of the epoxy resin composition can be determined using a differential scanning calorimeter by a method according to ASTM E698 and specifically can be measured by the method described in Examples.

For the epoxy resin composition of the present invention, from the viewpoint of the heat resistance of a cured product to be provided, the glass transition temperature (Tg) of the cured product is preferably higher.

For example, for the epoxy resin composition of the present invention, using a differential scanning calorimeter, after the composition is completely cured by heating from 30 to 225° C. at conditions of a heating rate of 10° C./minute, an operation in which the resulting cured product is cooled to 30° C. and heated again from 30 to 225° C. at conditions of a heating rate of 10° C./minute is repeated twice, and Tg measured at the second heating is preferably 125° C. or more, more preferably 127° C. or more, and further preferably 130° C. or more. Specifically, Tg of the cured product may be measured by the method described in Examples.

The epoxy resin composition of the present invention, which is characterized in that an epoxy resin cured product having a high Tg can be provided while excessive fast curing resulted from bis(aminomethyl)cyclohexane is suppressed, is suitable as a matrix resin precursor for use in filament winding molding on production of fiber-reinforced composite material (FRP), for example.

[Use]

The present invention also provides use of an amine composition for an epoxy resin curing agent, the amine composition comprising bis(aminomethyl)cyclohexane (A), a compound (B) represented by the following formula (1), and a compound (C) represented by the following formula (2), the mass ratio of the component (B) to the component (C) [(B)/(C)] being from 0.01 to 5.0.

In the present invention, "use of an amine composition for an epoxy resin curing agent" encompasses both use of an amine composition as it is as a curing agent, and use of a modified product provided by modifying the amine component in an amine composition as a curing agent.

The amine composition and a preferred form thereof are the same as described above.

EXAMPLES

Hereinafter, the present invention will be described in more detail with reference to Examples and Comparative Examples, but the present invention is not limited to the following Examples. Various measurements and evaluations on epoxy resin curing agents, epoxy resin compositions, and cured products thereof were carried out in the following manners.

(Curing Time)

About 5 mg of the epoxy resin composition of each Example was subjected to differential scanning calorimetry at conditions of a heating rate of 1° C./minute, 10° C./minute, and 20° C./minute each in a range of 30 to 220° C., using a differential scanning calorimeter "DSC25" (manufactured by TA Instruments Inc.). The reaction ratio was calculated from the resulting measurement chart according to the method described in ASTM E698, and the time required for the reaction ratio to reach 100% in the case of heating at 120° C. was calculated.

When the time measured by the method described above is 10 minutes or more, a significant effect of retarding the curing speed is assumed to have been achieved.

(Glass Transition Temperature (Tg) of Cured Product)

About 5 mg of the epoxy resin composition of each Example was heated from 30 to 250° C. at conditions of a heating rate of 10° C./minute and completely cured using a differential scanning calorimeter "DSC25" (manufactured by TA Instruments Inc.). An operation in which this cured product was cooled to 30° C. and heated again from 30 to 225° C. at a condition of a heating rate 10° C./minute was repeated twice, and Tg of the cured product was determined from the measurement chart at the second heating.

Example 1 (Preparation and Evaluation of Epoxy Resin Curing Agent and Epoxy Resin Composition)

12.5 parts by mass of 3-methylbenzylamine as the component (B) and 2.5 parts by mass of 3-methyl-1-aminomethylcyclohexane as the component (C) were added to 100 parts by mass of 1,3-bis(aminomethyl)cyclohexane (1,3-BAC, manufactured by Mitsubishi Gas Chemical Company, Inc., cis/trans ratio=77/23) as the component (A) and mixed to prepare an epoxy resin curing agent.

As the epoxy resin as the main agent of the epoxy resin composition, an epoxy resin having glycidyloxy groups derived from bisphenol A ("jER828" manufactured by Mitsubishi Chemical Corporation, bisphenol A diglycidyl ether, epoxy equivalent: 186 g/equivalent) was used. The epoxy resin and the epoxy resin curing agent were blended and mixed such that the ratio of the number of active hydrogen atoms in the epoxy resin curing agent to the number of epoxy groups in the epoxy resin as the main agent (number of active hydrogen atoms in the epoxy resin curing agent/number of epoxy groups in the epoxy resin) reached 1/1 to prepare an epoxy resin composition.

The resulting epoxy resin composition was used to measure the curing time and the cured product Tg by the methods described above. The results are shown in Table 1.

Examples 2 to 4 and Comparative Examples 1 to 5

An epoxy resin curing agent was prepared by formulating components each in parts by mass shown in Table 1. This epoxy resin curing agent was used to prepare an epoxy resin composition and to measure the curing time and the cured product Tg in the same manner as in Example 1. The results are shown in Table 1.

TABLE 1

| | Curing agent composition | | Example | | | | Comparative Example | | | | |
|---|---|---|---|---|---|---|---|---|---|---|---|
| | | | 1 | 2 | 3 | 4 | 1 | 2 | 3 | 4 | 5 |
| (A) | 1,3-BAC | Parts by mass | 100 | 100 | 100 | 100 | 100 | 100 | 100 | 100 | 100 |
| (B) | 3-MBA | Parts by mass | 12.5 | 2.5 | 2.5 | 7.5 | | 13.5 | 25.0 | | 5.0 |
| (C) | 3-MAMC | Parts by mass | 2.5 | | 2.5 | | | | | 2.5 | 2.5 |
| | CMA | Parts by mass | | 25.0 | | 7.5 | | 1.5 | | | |
| | Component (C) total | Parts by mass *1 | 2.5 | 25.0 | 2.5 | 7.5 | 0 | 1.5 | 2.5 | 2.5 | 0 |
| | Components (B) + (C) | Parts by mass *1 | 15.0 | 27.5 | 5.0 | 15.0 | 0 | 15.0 | 27.5 | 2.5 | 5.0 |
| | Mass ratio (B)/(C) | — | 5.0 | 0.1 | 1.0 | 1.0 | — | 9.0 | 10.0 | 0 | — |
| | Component (A) | Mass % | 87.0 | 78.4 | 95.2 | 87.0 | 100.0 | 87.0 | 78.4 | 97.6 | 95.2 |
| Evaluation results | Curing time (120° C.) | min. | 10.4 | 10.5 | 10.2 | 10.7 | 8.8 | 10.3 | 11.0 | 9.2 | 9.2 |
| | Cured product Tg | ° C. | 132 | 130 | 127 | 131 | 133 | 124 | 119 | 133 | 125 |

*1: Parts by mass based on 100 parts by mass of the component (A)

Abbreviations in the Table 1 are as follows.
1,3-BAC: 1,3-bis(aminomethyl)cyclohexane
3-MBA: 3-methylbenzylamine
3-MAMC: 3-methyl-1-aminomethylcyclohexane
CMA: cyclohexylmethylamine It can be seen from Table 1 that the epoxy resin compositions in which the epoxy resin curing agent of the present invention was used can provide a significant effect of retarding the curing speed and suppress decrease in Tg of a cured product to be provided in comparison with the epoxy resin composition of Comparative Example 1, in which only the component (A) was used as the epoxy resin curing agent. In contrast, in the epoxy resin compositions of Comparative Examples 2 to 5, of which the mass ratio [(B)/(C)] in the epoxy resin curing agent is out of the specified range of the present invention, could not achieve both an effect of retarding the curing speed and an effect of maintaining a high Tg of an epoxy resin cured product to be provided.

INDUSTRIAL APPLICABILITY

The epoxy resin curing agent of the present invention can provide an epoxy resin composition that can maintain a high Tg of an epoxy resin cured product to be provided while suppressing excessive fast curing property resulted from bis(aminomethyl)cyclohexane.

The invention claimed is:

1. An epoxy resin composition comprising an epoxy resin and an epoxy resin curing agent,
wherein the epoxy resin curing agent comprises an amine composition or a modified product thereof,
wherein the amine composition comprises:
bis(aminomethyl)cyclohexane (A),
a compound (B) of at least one selected from the group consisting of a compound (1-1) and a compound (1-2) represented by the following formulas:

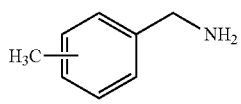
(1-1)

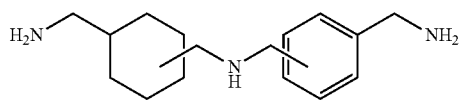
(1-2)

and
a compound (C) of at least one selected from the group consisting of a compound (2-1) and a compound (2-2) represented by the following formulas:

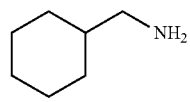
(2-1)

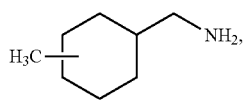
(2-2)

wherein a mass ratio of the component (B) to the component (C) [(B)/(C)] is from 1.0 to 5.0, and
wherein the epoxy resin curing agent is present in the epoxy resin composition at an amount such that a ratio of the number of active hydrogen atoms in the epoxy resin curing agent to the number of epoxy groups in the epoxy resin [(number of active hydrogen atoms in epoxy resin curing agent)/(number of epoxy groups in epoxy resin)] is from 1/0.5 to 1/2.

2. The epoxy resin composition according to claim 1, wherein the content of the component (B) based on 100 parts by mass of the component (A) is 0.01 parts by mass or more.

3. The epoxy resin composition according to claim 1, wherein the total content of the component (B) and the component (C) based on 100 parts by mass of the component (A) is from 2.5 to 50.0 parts by mass.

4. The epoxy resin composition according to claim 1, wherein the component (A) is 1,3-bis(aminomethyl)cyclohexane.

5. The epoxy resin composition according to claim 1, wherein the component (B) is the compound (1-2).

6. The epoxy resin composition according to claim 1, wherein the component (C) is the compound (2-1).

7. The epoxy resin composition according to claim 1, wherein the epoxy resin comprises 50 to 100 mass % of at least one resin selected from the group consisting of epoxy resins having a glycidylamino group derived from m-xylylenediamine, epoxy resins having a glycidylamino group derived from p-xylylenediamine, epoxy resins having a glycidyloxy group derived from bisphenol A, and epoxy resins having a glycidyloxy group derived from bisphenol F.

8. The epoxy resin composition according to claim 1, wherein a total content of the epoxy resin and the epoxy resin curing agent in the epoxy resin composition is 50 mass % or more.

* * * * *